United States Patent
Saul et al.

(10) Patent No.: US 7,802,195 B2
(45) Date of Patent: *Sep. 21, 2010

(54) DRAGGING AND DROPPING OBJECTS BETWEEN LOCAL AND REMOTE MODULES

(75) Inventors: Elton Saul, Kirkland, WA (US); Carl M. Carter-Schwendler, Redmond, WA (US); Nadim Y. Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/428,850

(22) Filed: Apr. 23, 2009

(65) Prior Publication Data

US 2009/0210811 A1    Aug. 20, 2009

Related U.S. Application Data

(63) Continuation of application No. 11/423,400, filed on Jun. 9, 2006, now Pat. No. 7,533,349.

(51) Int. Cl.
    *G06F 3/048*      (2006.01)
    *G06F 3/00*      (2006.01)
    *G06F 15/16*      (2006.01)

(52) U.S. Cl. ............ 715/769; 715/748; 715/770; 709/202; 709/203

(58) Field of Classification Search ............ 715/748, 715/769, 770; 709/202, 203
See application file for complete search history.

(56) References Cited

U.S. PATENT DOCUMENTS

| | | | |
|---|---|---|---|
| 6,138,150 A | 10/2000 | Nichols et al. | |
| 6,941,382 B1 | 9/2005 | Tuli | |
| 7,017,162 B2 | 3/2006 | Smith et al. | |
| 7,533,349 B2* | 5/2009 | Saul et al. | 715/769 |
| 7,721,254 B2* | 5/2010 | Relyea et al. | 717/109 |
| 2003/0167277 A1* | 9/2003 | Hejlsberg et al. | 707/102 |
| 2003/0167355 A1* | 9/2003 | Smith et al. | 709/328 |
| 2003/0172196 A1* | 9/2003 | Hejlsberg et al. | 709/328 |
| 2003/0177282 A1* | 9/2003 | Hejlsberg et al. | 709/328 |
| 2004/0199574 A1 | 10/2004 | Franco et al. | |
| 2006/0069797 A1 | 3/2006 | Abdo | |
| 2006/0070007 A1 | 3/2006 | Cummins et al. | |
| 2006/0092268 A1 | 5/2006 | Ahn et al. | |
| 2007/0282951 A1 | 12/2007 | Selimis et al. | |

FOREIGN PATENT DOCUMENTS

EP      20070282951      4/2005

OTHER PUBLICATIONS

Office Action mailed Jun. 27, 2008 for U.S. Appl. No. 11/423,400.
Notice of Allowance mailed Jan. 27, 2009 for U.S. Appl. No. 11/423,400.

* cited by examiner

*Primary Examiner*—William L Bashore
*Assistant Examiner*—David Phantana-angkool
(74) *Attorney, Agent, or Firm*—Workman Nydegger

(57) ABSTRACT

The present invention extends to methods, systems, and computer program products for dragging and dropping objects between local and remote modules. Terminal server components simulate the functionality of participants in drag and drag operations to facilitate the dragging and dropping of objects between local and remote modules and vice versa. The terminal server components interact locally to communicate with modules participating in a drag and drop operation. The terminal server components also send messages over a terminal server session to relay appropriate drag and drop information to corresponding terminal server components on the other end of the terminal server session.

29 Claims, 10 Drawing Sheets

DRAGGING AND DROPPING OBJECTS BETWEEN LOCAL AND REMOTE MODULES

CROSS-REFERENCE TO RELATED APPLICATIONS

This application is a Continuation of U.S. patent application Ser. No. 11/423,400 filed Jun. 9, 2006, and entitled "DRAGGING AND DROPPING OBJECTS BETWEEN LOCAL AND REMOTE MODULES". The foregoing application is incorporated herein by reference in its entirety.

BACKGROUND

1. Background and Relevant Art

Computer systems and related technology affect many aspects of society. Indeed, the computer system's ability to process information has transformed the way we live and work. Computer systems now commonly perform various tasks (e.g., word processing, scheduling, and database management) that prior to the advent of the computer system were performed manually. Typically, to perform these various tasks, a computer system includes a number of corresponding applications. For example, to perform word processing a computer system can include a word processing application, to manipulate spreadsheets a computer system can include a spreadsheet application, etc.

In a standalone computing environment, it is often useful to be able to move objects between applications that perform different tasks at a computer system. For example, it may be useful to move a portion of text generated in word processing application into a presentation program as the descriptive text for a picture or drawing. To enable movement of objects between applications, some computer systems include a portion of memory (e.g., a clipboard) that can be interfaced in a common manner by applications at the computer system. Thus, one application can interface with the portion of memory to store an object and then another application can interface with the portion of memory to retrieve the object. Thus, applications (even those that cannot compatibly exchange objects directly) can exchange objects through the portion memory.

Many standalone computing environments also include the more convenient ability to use input devices in combination with visual cues to directly transfer objects between compatible applications. One common mechanism for direct transfer between applications is "drag and drop". To facilitate drag and drop, a user identifies an object in one application (e.g., a portion of text, a picture, or a spreadsheet cell). For example, the user can highlight a portion of text with a mouse. A visual cue, for example, back lighting, can be used to indicate to the user that the text is selected.

The user manipulates input devices to select the identified object. For example, the user manipulates a mouse to move a cursor over the identified text and then can depress a left mouse button. The user then further manipulates input devices to move the object to another application. For example, while keeping the left mouse button depressed, the user can manipulate the mouse to move (drag) the cursor over the top of the other application. Once on top of the other application, the user can release the left mouse button. The act of releasing the mouse button causes the object to be transferred to (or dropped into) the other application.

In other environments, computer systems are coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

In a networked environment, it is also often useful to be able to move objects between applications that perform different tasks, wherein some applications are run locally and other applications are run remotely, for example, at a terminal server. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data. Thus, input is received and output presented at the client computer system, while processing actually occurs at the terminal server.

To enable movement of objects between local and remote applications, some networked computer systems include clipboard functionality similar that used in a standalone environment. A portion of memory (or clipboard) is allocated and can be interfaced in a common manner by applications at the computer system. Thus, a local application can interface with the portion of memory to store an object and then a remote application can interface with the portion of memory to retrieve the object or vice versa. Thus, applications (even those running at different computer systems) can exchange objects through the portion memory.

However, many networked computer systems lack the more convenient ability to drag and drop objects between local and remote applications and vice versa. That is, client and server terminal server components are typically not configured to transfer drag and drop objects over a terminal server session and to interact with a drop source or drop target to facilitate a drag and drop transfer. For example, a server component typically has no way to determine if the movement of a mouse cursor outside of a remote desktop window (at a client system) is associated with a drag and drop operation or if a user is moving the mouse for other reasons.

BRIEF SUMMARY

The present invention extends to methods, systems, and computer program products for dragging and dropping objects between local and remote modules. In some embodiments, an object is dragged and dropped from a local application to a remoted application. A client component detects that a desktop window cursor has been moved from outside to within the bounds of an application window for a remoted application. The client component receives a drop notification indicating a pending drag and drop operation. The drop notification indicates that a drag and drop object is to be transferred to the remoted application The client component sends a request to transfer the drag and drop object along with a coordinate location of the desktop window cursor to a server computer system over a terminal server session.

A server component receives the request and forwards a drag and drop object transfer notification to the remoted application. The server component acts as a proxy drop source on behalf of the local application in response to receiving the request to transfer a drag and drop object, including receiving a request for the drag and drop object from the remoted application. The server component forwards the request for the drag and drop object to the client component over the terminal server session.

The client component receives the request for the drag and drop object from the server computer system over the terminal server session. The client by component acts as a proxy drop target on behalf of the remoted application, including forwarding the request for the drag and drop object to the local application and receiving the drag and drop object from the local application. The client component sends the drag and drop object to the server computer system over the terminal server session.

The server component receives the drag and drop object from the client component over the terminal server session. The server component acts as a proxy drop source on behalf of the local application, including sending the drag and drop object to the remoted application.

In other embodiments, an object is dragged and dropped from a remoted application to a local application. A client component detects that a desktop window cursor has been moved from within to outside of the bounds of a remoted application. The client component sends a message to the server component over the terminal server session. The message indicates to the server component that the desktop window cursor has been moved from within to outside of the bounds of application window for the remoted application.

The server component receives the message from the client component over the terminal server session. The server component determines that the movement of the desktop window cursor is associated with a pending drag and drop operation.

The client component acts as a proxy drop source on behalf of the remoted application, including receiving a query for a drag and drop object from the local application. The query is indicative of a drop notification at the local application representing that the drag and drop object is to be transferred to the local application. The client component sends a request for the drag and drop object to the server component over the terminal server session.

The server component receives the request. The server component acts as a proxy drop target on behalf of the local application, including forwarding the request for the drag and drop object to the remoted application and receiving the drag and drop object from the remoted application. The server component sends the drag and drop object to the client computer system over the terminal server session.

The client component receives the drag and drop object. The client component acts as a proxy drop source on behalf of the remoted application, including sending the drag and drop object to the local application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
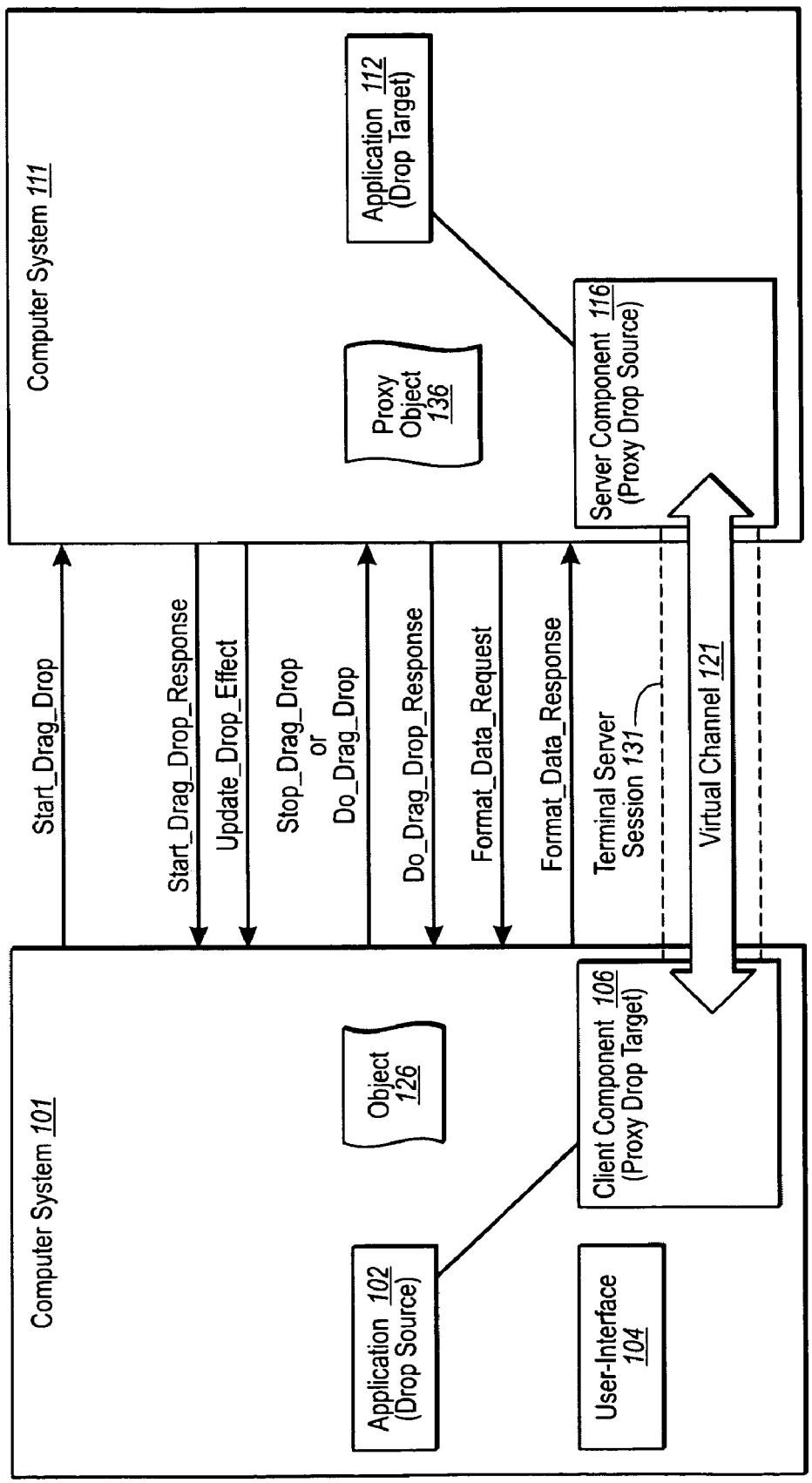
FIG. 1A illustrates an example computer architecture that facilitates dragging and dropping an object from a local module to a remote module.

The present invention extends to methods, systems, and computer program products for dragging and dropping objects between local and remote modules. In some embodiments, an object is dragged and dropped from a local application to a remoted application. A client component detects that a desktop window cursor has been moved from outside to within the bounds of an application window for a remoted application. The client component receives a drop notification indicating a pending drag and drop operation. The drop notification indicates that a drag and drop object is to be transferred to the remoted application The client component sends a request to transfer the drag and drop object along with a coordinate location of the desktop window cursor to a server computer system over a terminal server session.

A server component receives the request and forwards a drag and drop object transfer notification to the remoted application. The server component acts as a proxy drop source on behalf of the local application in response to receiving the request to transfer a drag and drop object, including receiving a request for the drag and drop object from the remoted application. The server component forwards the request for the drag and drop object to the client component over the terminal server session.

The client component receives the request for the drag and drop object from the server computer system over the terminal server session. The client component acts as a proxy drop target on behalf of the remoted application, including forwarding the request for the drag and drop object to the local application and receiving the drag and drop object from the local application. The client component sends the drag and drop object to the server computer system over the terminal server session.

The server component receives the drag and drop object from the client component over the terminal server session. The server component acts as a proxy drop source on behalf of the local application, including sending the drag and drop object to the remoted application.

In other embodiments, an object is dragged and dropped from a remoted application to a local application. A client component detects that a desktop window cursor has been moved from within to outside of the bounds a remoted application. The client component sends a message to the server component over the terminal server session. The message indicates to the server component that the desktop window cursor has been moved from within to outside of the bounds of application window for the remoted application.

The server component receives the message from the client component over the terminal server session. The server component determines that the movement of the desktop window cursor is associated with a pending drag and drop operation.

The client component acts as a proxy drop source on behalf of the remoted application, including receiving a query for a drag and drop object from the local application. The query is indicative of a drop notification at the local application representing that the drag and drop object is to be transferred to the local application. The client component sends a request for the drag and drop object to the server component over the terminal server session.

The server component receives the request. The server component acts as a proxy drop target on behalf of the local application, including forwarding the request for the drag and drop object to the remoted application and receiving the drag and drop object from the remoted application. The server component sends the drag and drop object to the client computer system over the terminal server session.

The client component receives the drag and drop object. The client component acts as a proxy drop source on behalf of the remoted application, including sending the drag and drop object to the local application.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "drop target" is defined as a module that is to receive an object that is the subject of a drag and drop operation.

In this description and in the following claims, a "drop source" is defined as a module that is to originate an object that is the subject of a drag and drop operation.

In this description and in the following claims, a "proxy drop target" is defined as a module associated with the same session as the drop source and acts as an intermediary between the drop source and the drop target. A proxy drop target can simulate functionality of an actual drop target to facilitate a drag and drop operation over a terminal server session. In some embodiments, a proxy drop target is a terminal server session component that simulates drop target functionality and participates in the management of a terminal server session.

In this description and in the following claims, a "proxy drop source" is defined as a module associated with the same session as the drop target and acts as an intermediary between the drop source and the drop target. A proxy drop source can simulate functionality of an actual drop source to facilitate a drag and drop operation over a terminal server session. In some embodiments, a proxy drop source is a terminal server session component that simulates drop source functionality and participates in the management of a terminal server session.

In this description and in the following claims, messages exchanged via network communication to facilitate drag and drop operations are generally defined as follows:

START_DRAG_DROP message: an indication from a proxy drop target to a proxy drop source to initiate a drag and drop modal loop. The message can include the names and IDs of the format data which can be provided.

START_DRAG_DROP_RESPONSE message: an indication from a proxy drop source that the drag and drop modal loop has commenced for the drop target.

UPDATE_DROP_EFFECT message: indicates the updated drop-effect for a drop target. That is, what the drop target would like to do with the data.

STOP_DRAG_DROP message: an indication from the proxy drop target to the proxy drop source to stop the drag and drop operation.

DO_DRAG_DROP message: an indication from the proxy drop target to the proxy drop source to initiate a drop operation. A Drop message, indicative of a DO_DRAG_DROP message sent via network communication, can be forward via Object Linking And Embedding ("OLE") to the drop target. In response to a Drop message, the drop target can request a proxy data object and call a GetData method.

DO_DRAG-DROP_RESPONSE message: an indication from the proxy drop source that the drag and drop operation is complete (e.g., sent in response to DO_DRAG_DROP message).

FORMAT_DATA_REQUEST message: sent by a proxy data object to the proxy drop target when data is requested by the drop target.

FORMAT_DATA_RESPONSE message: sent by a proxy drop target to the proxy data object and contains any requested data.

Other messages can also be exchanged via a network to facilitate drag and drop operations.

FIG. 1A illustrates an example computer architecture 100 that facilitates dragging and dropping an object from a local module to a remote module. Computer system 101 (e.g., a client) and computer system 111 (e.g., a server). Computer systems 101 and 111 can be connected to a network, such as, for example, Local Area Network ("LAN"), a Wide Area Network ("WAN"), or even the Internet. Thus, the various components at computer systems 101 and 111 can receive data from and send data to each other, as well as other components connected to the network. Accordingly, the components can create message related data and exchange message related data over the network (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Independent Computing Architecture ("ICA"), etc).

As depicted computer system 101 includes application 102, client module 106, and user-interface 104 and computer system 111 includes application 112, and server module 116. Computer system 101 and computer system 111 are in communication with one another via a terminal server session 131 (e.g., an RDP session) established over a network. Client component 106 and server component 116 can interoperate to facilitate management of terminal server session 131. For example, transferring user-input received at user-interface 104 from computer system 101 to computer system 111, forwarding user-input to appropriate remote applications at computer system 111, receiving output from remote applications at computer system 111, transferring remote application output from computer system 111 to computer system 101, and outputting remote application output at user-interface 104. Thus, for remote applications (from the perspective of user-interface 104), input is received and output presented at the computer system 101, while processing actually occurs at computer system 111.

Virtual channels can be used to extend terminal server session functionality (e.g., by extending the RDP protocol) allowing applications to transfer application specific data over a terminal server session (e.g., an RDP connection). Thus, in addition to input and output data, other types of data can be exchanged over virtual channels. For example, virtual channel 121 can be a channel configured to transfer drag and drop objects from computer system 101 to computer system 111. Virtual channel 121 can connect a drag and drop thread at client component 106 to a drag and drop thread at client server component 116 and vice versa. Accordingly, client component 106 and server component 116 can interoperate to drag and drop data over virtual channel 121 between appropriate applications at computer system 101 and computer system 111.

Figure 1B:
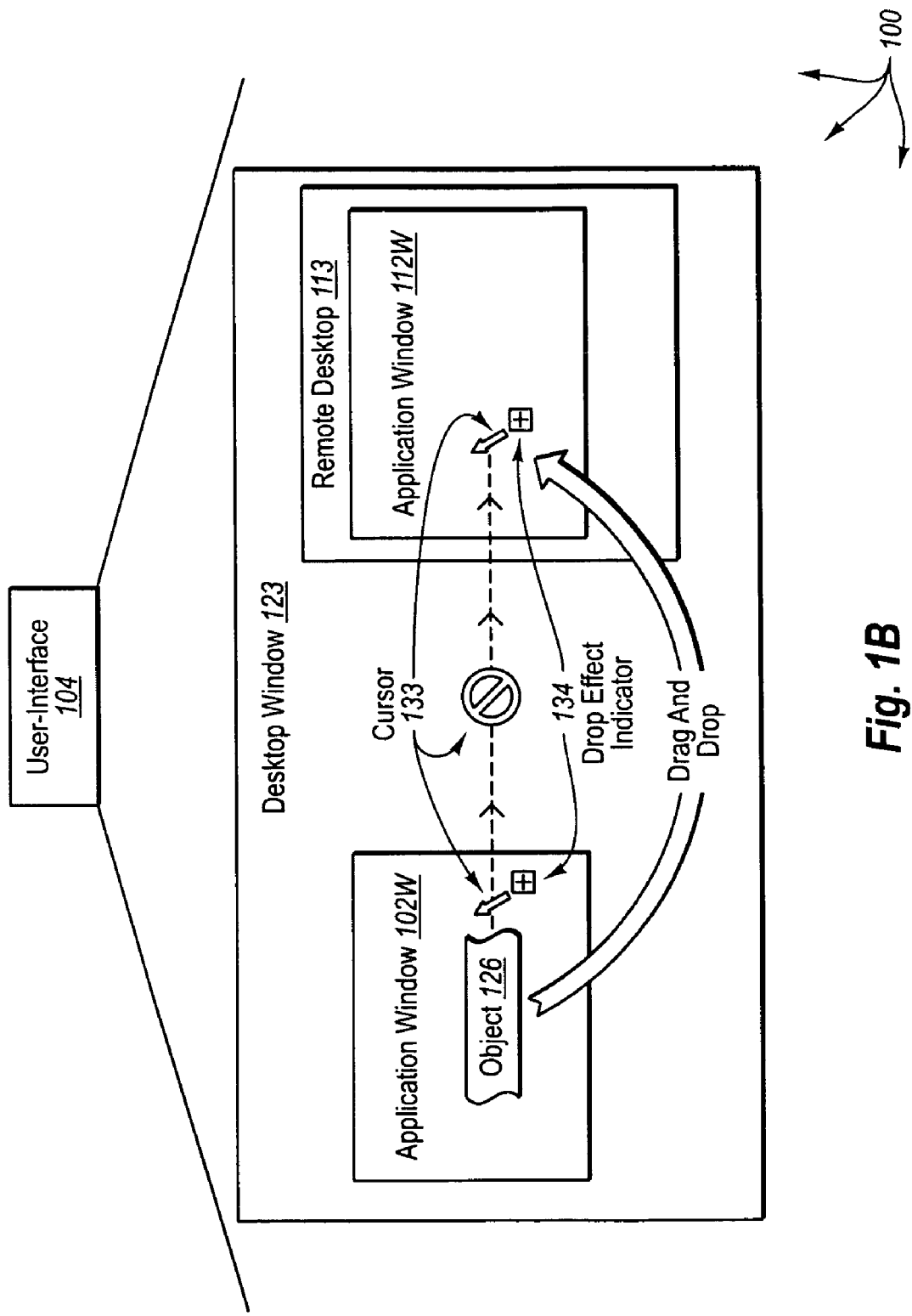
FIG. 1B illustrates an example desktop window depicting a drag and drop operation from a local module to a remote module.

FIG. 1B illustrates an example desktop window 123 depicting a drag and drop operation from a local module to a remote module. As depicted, desktop window 123 is a portion of user-interface 104 and includes application window 102W and remote desktop 113. Application window 102W corresponds to application 102 and is configured to receive user-input for application 102 and present output from application 102 to a user. Remote desktop 113 includes application windows for any applications that are being remoted from computer system 111. For example, application window 112W corresponds to application 112 and is configured to receive user-input for application 112 and present output from application 112 to a user.

Figure 2A:
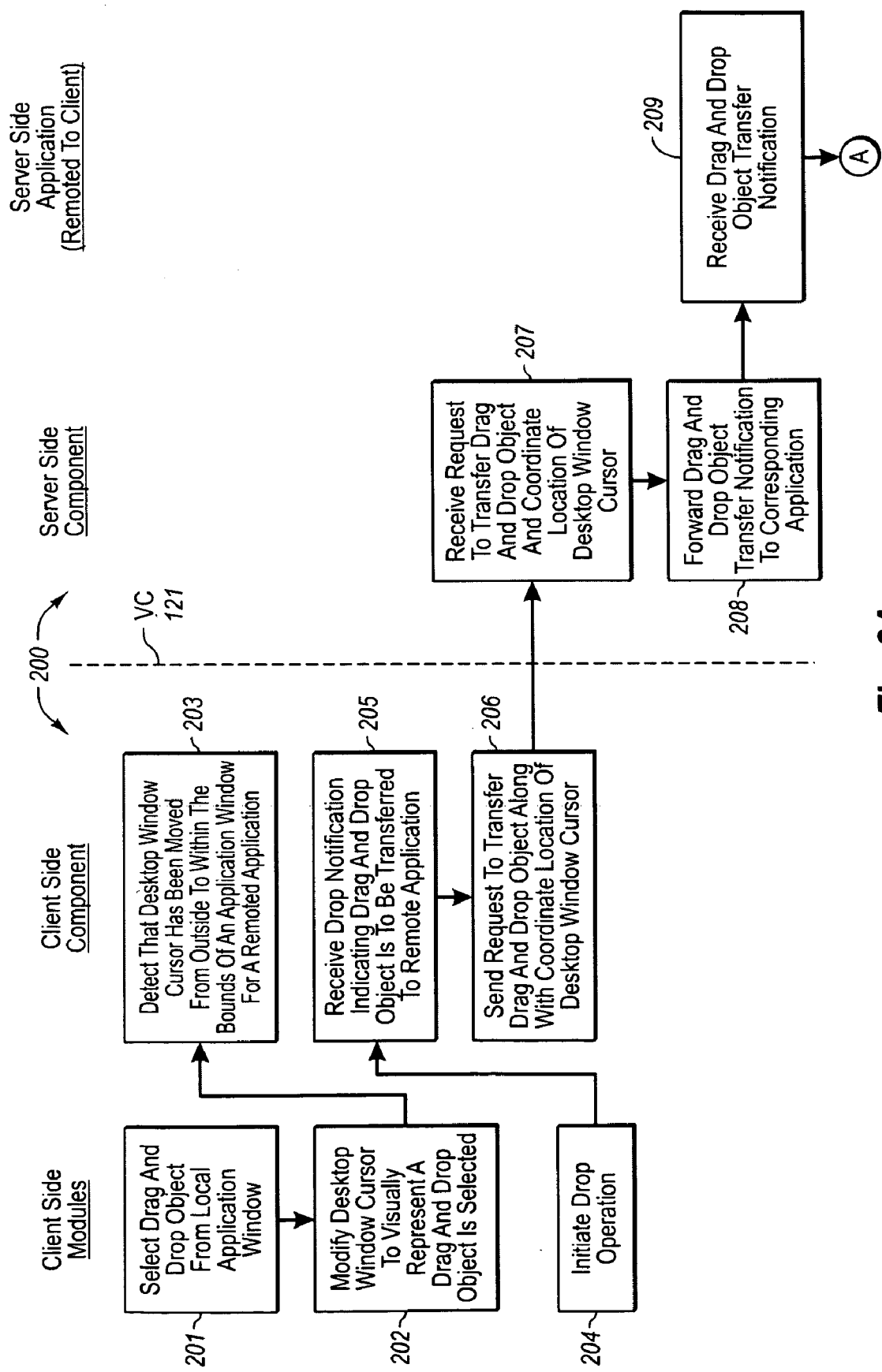
FIGS. 2A-2C illustrate a flow chart of an example method for dragging and dropping an object from a local module to a remote module.
Figure 2B:
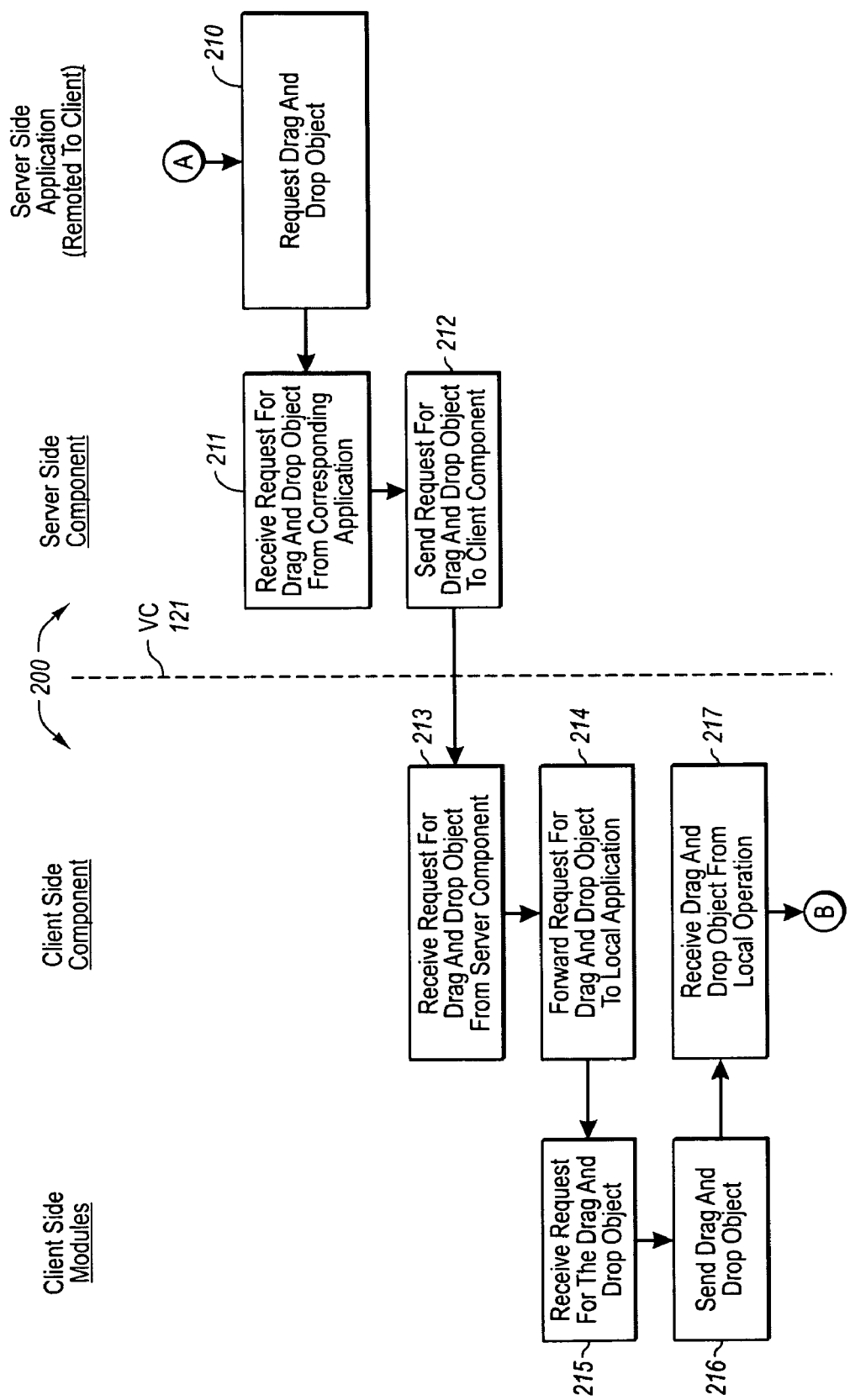
Figure 2C:
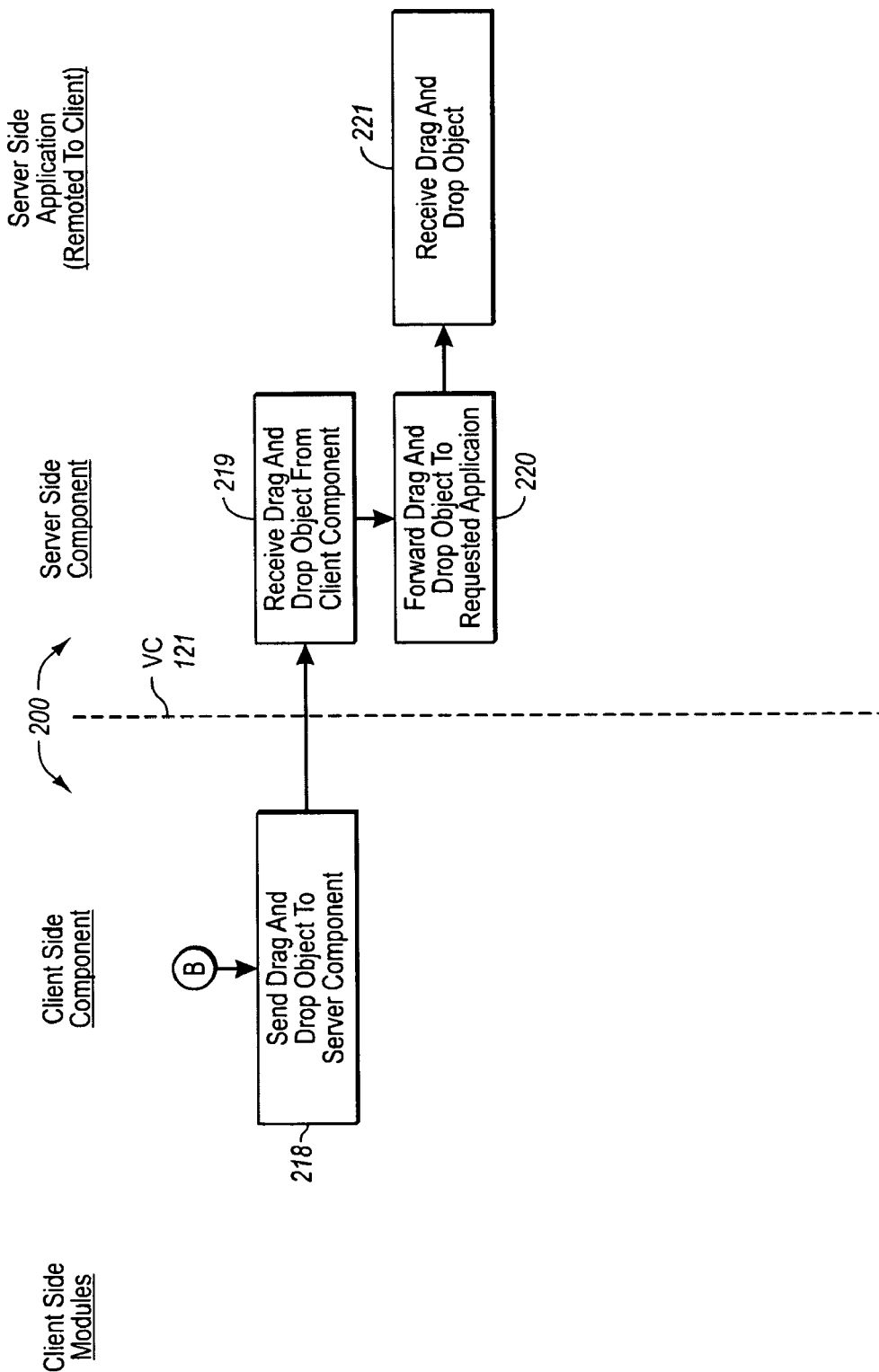

FIGS. 2A-2C illustrate a flow chart of an example method 200 for dragging and dropping an object from a local module to a remote module. The method 200 will be described with respect to the components and data in computer architecture 100.

Method 200 includes an act of selecting a drag and drop object from a local application window (act 201). For example, a user of computer system 101 can select object 126 from within application window 102W. Object 126 can be virtually any selectable object at computer system, such as, for example, a portion of text, graphics, or sound data, a spreadsheet cell, a database entry, an electronic message, etc.

Method 200 includes an act of modifying a desktop window cursor to visually represent that a drop and drop object is selected (act 202). For example, after selection of object 126, cursor 133 can be modified to include drop effect indicator 134. Drop effects can include any of moving, copying, linking, creating a hyperlink to, and creating a shortcut to the selected object. Cursor 133 can be modified or supplemented in different ways to indicate different drops effects. For example, drop effect indicator 134 can be displayed to indicate that the drop effect is copy.

A drop effect can be selected from the drop effects available to an application. As cursor 133 transitions between different windows of desktop window 123, the presented drop effect indictor can change. For example, while cursor 133 is within the bounds of application window 102W, a default drop effect for application 102 (e.g., of copy) can be displayed. When cursor 133 is outside the bounds of any application window, a default drop effect for desktop window 123 (e.g., the operating system) can be displayed. For example for desktop window 123, drag and drop functionality may not be supported at all and thus cursor 133 is transformed to the "not permitted" symbol when in this area of user-interface 104. Upon entering application window 112W, a default drop effect for application 112 (e.g., of copy) can be displayed.

Method 200 includes an act of a client component detecting that the desktop window cursor has been moved from outside to within the bounds of a application window for a remoted application (act 203). For example, client component 106 can detect that cursor 133 has been moved from outside to within the bounds of application window 112W. (The dashed line in FIG. 1B indicates the path of cursor 133 from application window 102W, through desktop window 123 and remote desktop 113, to application window 112W.)

Acts 201, 202, and 203 can be included in setting up a drag and drop operation to transfer an object from a local application to a remote application. When cursor 134 is hovering over application window 112W, client component 106 can invoke a DragEnter method. Through a DragEnter method, client component 106 (acting as a drop target proxy) can indicate back to application 102 if it can accept object 126. Parameters of a DragEnter method can be of the format:

```
HRESULT DragEnter(
    IDataObject*    pDataObject,    // Source data object (e.g. object
                                    126).
    DWORD           dwKeyState,     // Keyboard and mouse state.
    POINTL          pt,             // Cursor position.
    DWORD*          pdwDropEffect   // Resultant drop-effect.
)
```

Through a DragEnter method, a target (or proxy target) can indicate whether it will be able to accept a possible drop by updating the pdwDropEffect parameter. This parameter can initially contain the set of drop-effects that the source permits. The resultant drop-effect is based in part on the formats supplied by the data object and can also be influenced by the current keyboard and mouse state, and potentially even the mouse position.

Subsequently, client component 106 can send a START_DRAG_DROP message over virtual channel 121 (e.g., a clipboard virtual channel) to server component 116. The START_DRAG_DROP message can include the format names describing the contents of object 126 and the allowed drop effects of application 102. After this message has been sent, an input handler at compute system 101 is informed (e.g., through an operating system event) that a drag and drop operation has begun. In response to this event, the input handler can disable keyboard hooking and input synchronization. To make sure that requests for format data can be fulfilled before the drop takes place, the object 126 can be stored.

When the START_DRAG_DROP message is received at server component 116, the format names describing the content of object 126 and the allowed drop-effects of application 102 are extracted. In response, proxy data object 136 is created and a window for server component 116 is created. The window can be made transparent (or otherwise hidden) and can be of a very small size (e.g., 1×1 pixel size). The window is given focus and raised to the top of the z-order. Thus, input can be directed (clipped) to the window to direct the input to server component 116. As such, input can be directed to server component 116 without significantly altering desktop window 123. For example, a 1×1 transparent window is potentially imperceptible by a user.

In response to a received mouse down event, server component 116 (the proxy drop source) invokes a DoDragDrop method. Parameters of a DoDragDrop method can be of the format:

```
HRESULT DoDragDrop(
    IDataObject*    pDataObject,        // Source data object.
    IDropSource*    pDropSource,        // Drop source interface.
    DWORD           dwAllowedDropEffects, // Allowed drop-effects.
    DWORD*          pdwFinalDropEffect  // Final drop-effect.
)
```

A DoDragDrop method can be included in a modal loop used to facilitate a drag and drop operation. Generally, to start the drag and drop operation, a component calls DoDragDrop with the appropriate parameters. DoDragDrop captures the mouse using a SetCapture API and then enters a loop.

To forward input to server component 116, an input handler sends a mouse down event to client component 106 and because the mouse has been clipped to the (potentially small and transparent) window for server component 116, the mouse down event ends up being sent to server component 116's input queue. Reception of the mouse down event can be used to configure an Object Linking and Embedding ("OLE") hidden window to receive system-wide mouse event messages Reception of the START_DRAG_DROP_RESPONSE also triggers switching a Boolean flag which the methods at client component 106 check before executing. This increases the likelihood of sending messages when server component 116 is active.

While cursor 133 is being dragged over application window 112W, a DragOver method is called. Parameters of a DoDragDrop method can be of the format:

```
HRESULT DragOver(
    DWORD       dwKeyState,     // Keyboard and mouse state.
    POINTL      pt,             // Cursor position.
    DWORD*      pdwDropEffect   // Resultant drop-effect.
)
```

During calls to DragOver the current mouse position, mouse button state, and keyboard state can be checked for changes. If changes are detected, the input handler for client component 106 sends an appropriate mouse move, mouse button up or down, or keyboard button up or down message to server component 116.

Server component 116 (the proxy drop source) can continually call a QueryContinueDrag method. Parameters of a QueryContinueDrag method can be of the format:

```
HRESULT QueryContinueDrag(
    BOOL    fEscapePressed,     // TRUE if ESC has been pressed.
    DWORD   dwKeyState          // Keyboard and mouse state.
)
```

The QueryContinueDrag method can be used to inform the drop source (or proxy drop source) of the current keyboard and mouse state. Based on this input, the drop source (or proxy drop source) can decide to continue with drag, cancel the drag, or allow a drop to take place. The drop source indicates its decision through the HRESULT return value. For example, S_OK can indicate continue, DRAGDROP_S_CANCEL can indicate cancel and DRAGDROP_S_DROP can indicate allow the drop. While cursor 133 is hovering over application window 112W, QueryContinueDrag can return S_OK because a cancel or drop operation has not yet taken place.

Server component 116 can also invoke a GiveFeedback method to return the drop-effect (move, copy, link, etc.) of application 112 to client component 106. Parameters of a GiveFeedback method can be of the format:

```
HRESULT GiveFeedback(
    DWORD       dwDropEffect    // Current target (e.g.,
                                application 112)
                                // drop-effect .
)
```

Generally, a GiveFeedback method informs a drop source (or proxy drop source) of the current drop-effect so that it can give appropriate visual feedback. The visual feedback is indicated through the HRESULT return value. A value of S_OK means that the source set the cursor appropriately, while DRAGDROP_S_USEDEFAULTCURSORS indicates that the source is satisfied with using the OLE-provided default cursors.

When server component 116 calls GiveFeedback, the drop-effect of application 112 is sent from server component 116 to client component 106 over virtual channel 121 in an UPDATE_DROP_EFFECT message. Client component 106 stores the drop effect and returns the drop effect to application 102 (e.g., by invoking a DragOver method).

Based on the mouse and keyboard state at computer system 101, application 102 can eventually decide to cancel the drag operation or allow a drop to occur. Thus in some embodiments, a drag operation is canceled (and thus no drop occurs). If a cancel takes place, client component 106 (the proxy drop target) is informed through a DragLeave method, for example, of the format:

HRESULT DragLeave( );

An event handler for server component 116 can store the cancel result indicated in a STOP_DRAG_DROP message. Thus, the next time QueryContinueDrag is called, it returns DRAGDROP_S_CANCEL, causing the drag operation to end in at computer system 111.

In other embodiments, a drop occurs. Accordingly, method 200 includes an act of initiating a drop operation (act 204). For example, application 102 can initiate a drop operation to transfer object 126 to application 112. A user can manipulate an input device to cause a drop to initiate. For example, a user can release the left mouse button of a mouse while cursor 133 is hovering over application window 112W.

Method 200 includes an act of receiving a drop notification indicating a drag and drop object is to be transferred to a remote application (act 205). For example, client component 106 can receive a drop notification indicating that object 126 is to be transferred to application 112 as part of a pending drag and drop operation. Method 200 includes an act of sending a request to transfer the drag and drop object along with the coordinate location of the desktop cursor window (act 206). For example, in response to receiving the drop notification, client component 106 can send a DO_DRAG_DROP message to server component 116 to request transfer of object 126 to application 112. The DO_DRAG_DROP message can be sent over virtual channel 121 and can include the coordinate location of cursor 133.

Method 200 includes an act of receiving a request to transfer the drag and drop and coordinate location of the desktop window cursor (act 207). For example, server component 116 can receive the DO_DRAG_DROP message requesting transfer of object 126 to application 112. When the DO_DRAG_DROP message arrives at server component 116, at event handler stores an indication that a drop is to occur. Thus, when QueryContinueDrag is next called, QueryContinueDrag returns DRAGDROP_S_DROP (indicative that a drop is to occur). However, before returning this value, a GIVE_FOCUS message can be sent to client component 106. On reception of the GIVE_FOCUS message, client component 106 can obtain input focus by calling a SetForegroundWindow API.

Server component 116 can also send DO_DRAG_DROP_RESPONSE message to client component 106 over virtual channel 121.

Method 200 includes an act of forwarding the drag and drop object transfer notification to the corresponding application (act 208). For example, server component 116 can forward the drop notification for object 126 to application 112, based on the coordinate location of cursor 133 (e.g., hovering over application window 112W). Method 200 includes an act of receiving a drag and drop object transfer notification (act 209). For example, application 112 can receive the drop notification for object 126 from server component 116.

Method 200 includes an act of requesting the drag and drop object (act 210). For example, application 112 can request object 126 from server component 116. Method 200 includes an act of receiving a request for the drag and drop object from the corresponding application (act 211). For example, server component 116 can receive a request for object 126 from application 112. Server component 116 can detect the GetData call on proxy object 136.

Method 200 includes an act of sending the request for the drag and drop object to the client component (act 212). For example, server component 116 can send a FORMAT_DATA_REQUEST message to client component 106 over virtual channel 121. The FORMAT_DATA_REQUEST message requests object 126 for application 102. Method 200 includes an act of receiving a request for the drag and drop object from the server component (act 213). For example, client component 106 can receive the FORMAT_DATA_REQUEST message from server component 116 over virtual channel 121.

Method 200 includes an act of forwarding the request for the drag and drop object to the local application (act 214). For example, client component 106 can forward the request for object 126 to application 102. Method 200 includes an act of receiving a request for the drag and drop object (act 215). For example, application 102 can receive the request for object 126.

In some embodiments, the event handler for the FORMAT_DATA_REQUEST message uses a reference for a drag and drop object stored in a DragEnter method to perform a GetData call. When the format data has been retrieved, it is appropriately encoded.

Method 200 includes an act of sending the drag and drop object (act 216). For example, after returned formats and drop-effects are received, application 102 can send object 126 to client component 106. Method 200 includes an act of receiving the drag and drop object from the local application (act 217). For example, client component 106 can receive object 126 from application 102.

Method 200 includes an act of sending the drag and drop object to the server component (act 218). For example, client component 106 can send a FORMAT_DATA_RESPONSE message, including data from object 126, to server component 116 over virtual channel 121. Method 200 includes an act of receiving the drag and drop object from the client component (act 219). For example, server component 116 can receive the FORMAT_DATA_RESPONSE message, including data from object 126, from client component 106 over virtual channel 121.

Method 200 includes an act of forwarding the drag and drop object to the remote application (act 220). For example, server component 116 can forward data from object 126 to application 112. Method 200 includes an act of receiving the drag and drop object (act 221). For example, application 112 can receive data from object 126. Accordingly, depending on the selected drop effect, data from object 126 is moved, copied, linked, hyperlinked, or shortcutted from application 102 to application 112.

In some embodiments, appropriately encoded data is subsequently transmitted over the wire in a FORMAT_DATA_RESPONSE message. Upon the reception of this FORMAT_DATA_RESPONSE message at server component 116), an appropriate event handler is called and the formatted data is extracted and decoded. Once the event handler completes execution, the formatted data is returned to the drop target, resulting in the Drop method call of the local drop target completing.

When the Drop call is over, the DoDragDrop loop terminates and the drop-effect is returned (e.g., to server component 116). The drag and drop object is queried for the PerformedDropEffect and LogicalPerformedDropEffect. These two formats, as well as the final drop-effect and DoDragDrop HRESULT, are sent local to client component 106 in a DO_DRAG_DROP_RESPONSE message. Server component 116 returns these results to its proxy Drop method. Upon reception of DO_DRAG_DROP_RESPONSE message, an event handler at client component 106 stores the results. Server component 116's proxy Drop method continues execution, initializing the object 126 with the returned formats and returning the drop-effect and HRESULT to the OLE subsystem.

Client component 106 (the proxy drop target) and server component 116 (the proxy drop source) can be configured in various different ways to facilitate the implementation of method 200.

For example, client component 106 (the proxy drop target) can be configured to indicate when a drag and drop modal loop is to start. Client component 106 can send a START_DRAG_DROP message over virtual channel 121 to server component 116. When START_DRAG_DROP is processed, server component 116 (the proxy drop source) can start a drag and drop model loop for application 112 (the drop target).

Client component 106 can also be configured to send lists of formats that application 102 (the drop source) can support. One of the parameters to a DragEnter method is a pointer to the data object containing the data that application 102 is able to provide. Using a format enumerator, the format names are extracted from this data object, encoded and then sent as a parameter to a START_DRAG_DROP message so that a proxy data object can be created by server component 116.

Client component 106 can also be configured to update the remote mouse position, key-state and keyboard state. Just before starting the drag and drop modal loop, server component 116 can send a START_DRAG_DROP_RESPONSE message over virtual channel 121. When this message is received by client component 106, client component 106's DragOver method is freed to start sending updates of the current mouse position, mouse key-state and keyboard state to server component 116. The key-states for both the mouse and keyboard are obtained from the parameters passed to a DragOver method. These updates compensate for application 102 having input focus and mouse capture.

Client component 106 can also be configured to return the latest drop-effect received from server component 116. Server component 116 can send UPDATE_DROP_EFFECT messages to the client component 106 whenever application 112 changes the drop-effect. As part of the DragOver processing, updated drop-effects are returned to the OLE subsystem of computer system 101 to inform the application 102 of the current drop-effect.

Client component 106 can also be configured to update server component 116 regarding the state of the current drag operation. If a DragLeave method has been called, then application 102 decided to cancel the drag and drop operation. Accordingly, the application 112 should do the same and call its DragLeave method. Client component 106 can relay appropriate information to server component 116 to cause application 112 to call its DragLeave method.

Client component 106 can also be configured to store a pointer to object 126 if a drop occurs. If a drop takes place, then application 112 can request object 126. To help insure that object 126 can be returned, the client component 106 can store a pointer to object 126 received in the Drop call. Thus when a request for the object is received in the form of a FORMAT_DATA_REQUEST message, the client component 116 can supply the appropriate format data by performing a GetData call on the saved object 126, and return the data in a FORMAT_DATA_RESPONSE message.

Server component 116 can be configured to create a proxy data object advertising the correct formats names. One of the START_DRAG_DROP message parameters is a list of formats that application 112 is able to provide. Before the remote modal loop is started, a proxy data object is created and populated with these format names. The created data object is then passed to the OLE subsystem of computer system 111 as a parameter in the DoDragDrop call. Thus, drop targets within the remote session will be able to query the formats and retrieve the data if a drop occurs.

Server component 116 can also be configured to relay the current drop-effect to the client component 106. The drop-effect that application 112 returns to the OLE subsystem of computer system 111 is passed to the client component 106 as part of a GiveFeedback call. This drop-effect is sent over virtual channel 121 to the computer system 101 in an UPDATE_DROP_EFFECT message so that client component 106 can return this drop-effect when its DragOver method is called.

Server component 116 can also be configured to initiate a cancel or a drop when instructed by client component 106. When a drop or cancel operation takes place at computer system 101, the Drop or DragLeave method of client component 106 can be called. When this happens, a message is sent to server component 116 so that the next time QueryContinueDrag is called, the correct HRESULT can be returned to the OLE subsystem of computer system 111. If the STOP_DRAG_DROP message was received, then DRAGDROP_S_CANCEL is returned. DRAGDROP_S_DROP is returned if the DO_DRAG_DROP message was received. Otherwise, S_OK is returned and the modal loop continues.

Proxy object 136 can be created when a START_DRAG_DROP message is received. Proxy object 136 essentially mimics object 126 by returning the same formats advertised by object 126. When data is requested from proxy object 136, it sends a FORMAT_DATA-REQUEST message to computer system 101. Client component 106 can then retrieve the data from object 126 and sends the data back in a FORMAT_DATA_RESPONSE message.

Accordingly, embodiments of the present invention can facilitate dragging and dropping objects from a remote module to a local module.

Figure 3A:
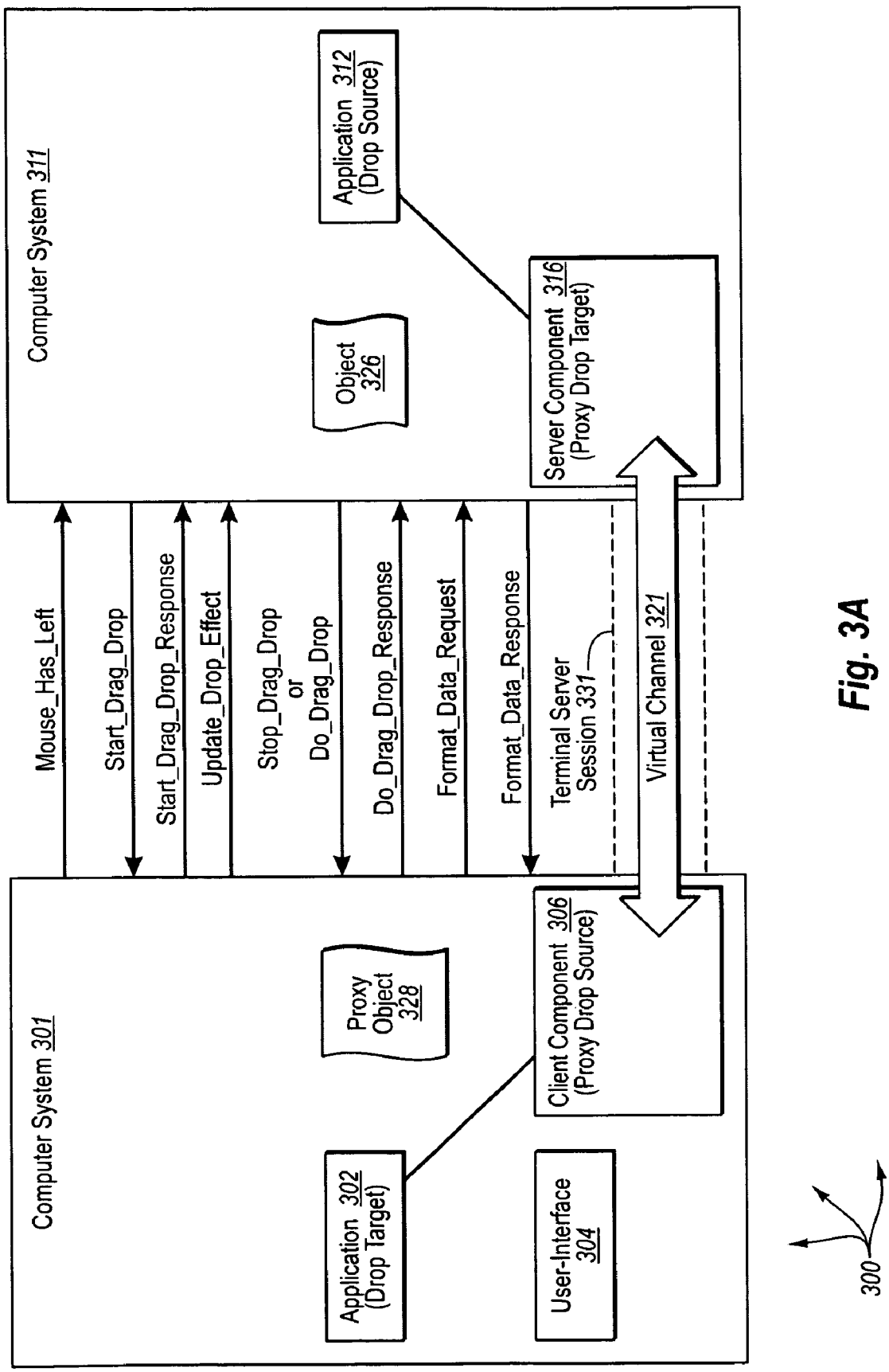
FIG. 3A illustrates an example computer architecture that facilitates dragging and dropping an object from a remote module to a local module.

FIG. 3A illustrates an example computer architecture 300 that facilitates dragging and dropping an object from a remote desktop module to a local desktop module. Computer system 301 (e.g., a client) and computer system 311 (e.g., a server). Computer systems 301 and 311 can be connected to a network, such as, for example, a Local Area Network ("LAN"), a Wide Area Network ("WAN"), or even the Internet. Thus, the various components at computer systems 301 and 311 can receive data from and send data to each other, as well as other components connected to the network. Accordingly, the components can create message related data and exchange message related data over the network (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Independent Computing Architecture ("ICA"), etc).

As depicted computer system 301 includes application 302, client module 306, and user-interface 304 and computer system 111 includes application 312, and server module 316. Computer system 301 and computer system 311 are in communication with one another via terminal server session 331 (e.g., an RDP session) established over the network. Client component 306 and server component 316 can interoperate to facilitate management terminal server session 331. For example, transferring user-input received at user-interface 304 from computer system 301 to computer system 311, forwarding user-input to appropriate remote applications at computer system 311, receiving output from remote applications at computer system 311, transferring remote application output from computer system 311 to computer system 301, and outputting remote application output at user-interface 304. Thus, for remote applications (from the perspective of user-interface 304), input is received and output presented at the computer system 301, while processing actually occurs at computer system 311.

Virtual channel 321 can be a channel configured to transfer drag and drop objects from computer system 311 to computer system 301. Virtual channel 321 can connect a drag and drop thread at client component 306 to a drag and drop thread at server component 316 and vice versa. Accordingly, client component 306 and server component 316 can interoperate to transfer drag and drop data over virtual channel 321 between appropriate applications at computer system 301 and computer system 311.

Figure 3B:
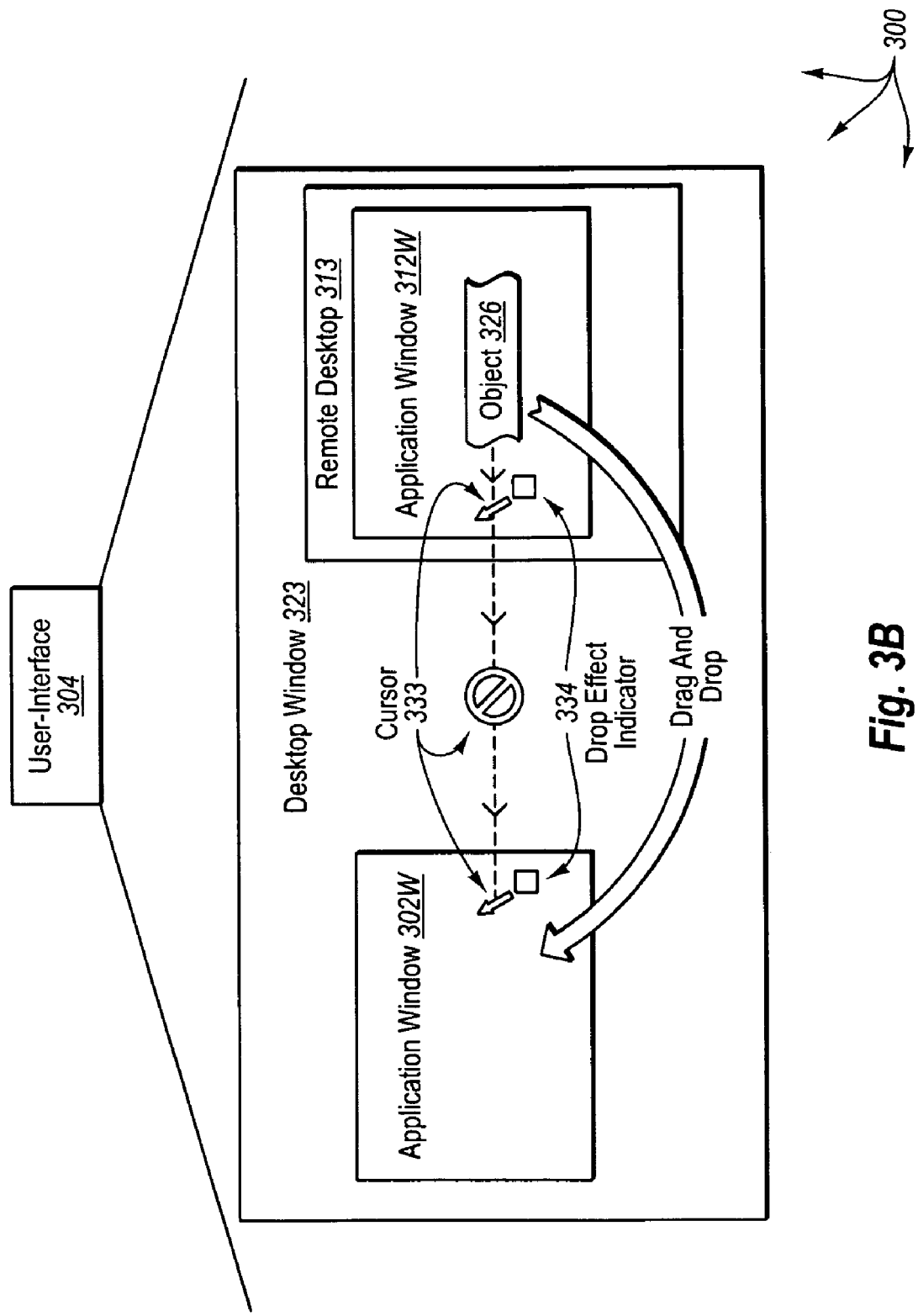
FIG. 3B illustrates an example desktop window depicting a drag and drop operation from a remote module to a local module.

FIG. 3B illustrates an example desktop window 323 depicting a drag and drop operation from a local module to a remote module. As depicted, desktop window 323 is a portion of user-interface 304 and includes application window 302W and remote desktop 313. Application window 302W corresponds to application 302 and is configured to receive user-input for application 302 and present output from application 302 to a user. Remote desktop 313 includes application windows for any applications that are being remoted from computer system 311. For example, application window 312W corresponds to application 312 and is configured to receive user-input for application 312 and present output from application 312 to a user.

Figure 4A:
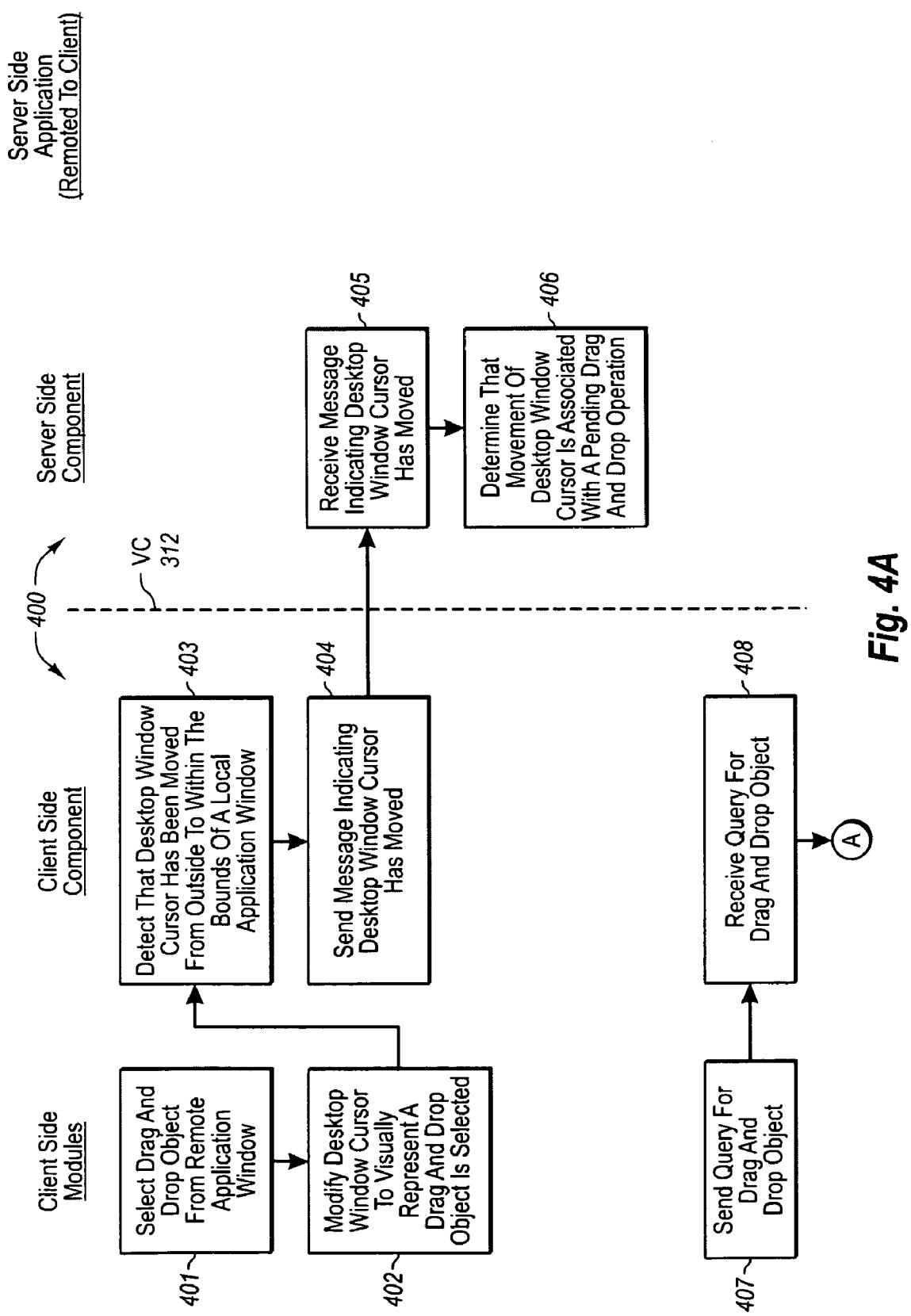
FIGS. 4A-4C illustrate a flow chart of an example method for dragging and dropping an object from a remote module to a local module.
Figure 4B:
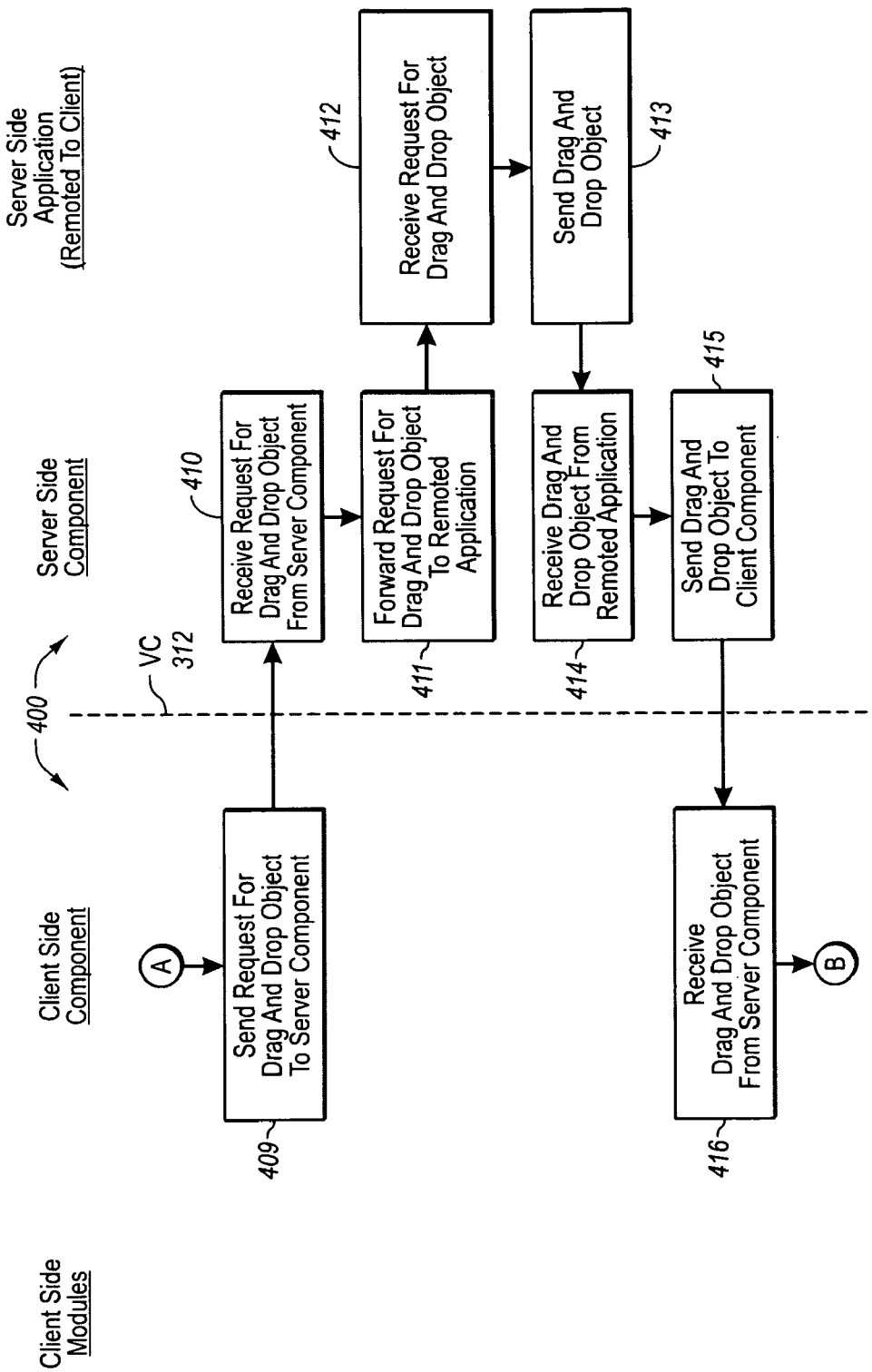
Figure 4C:
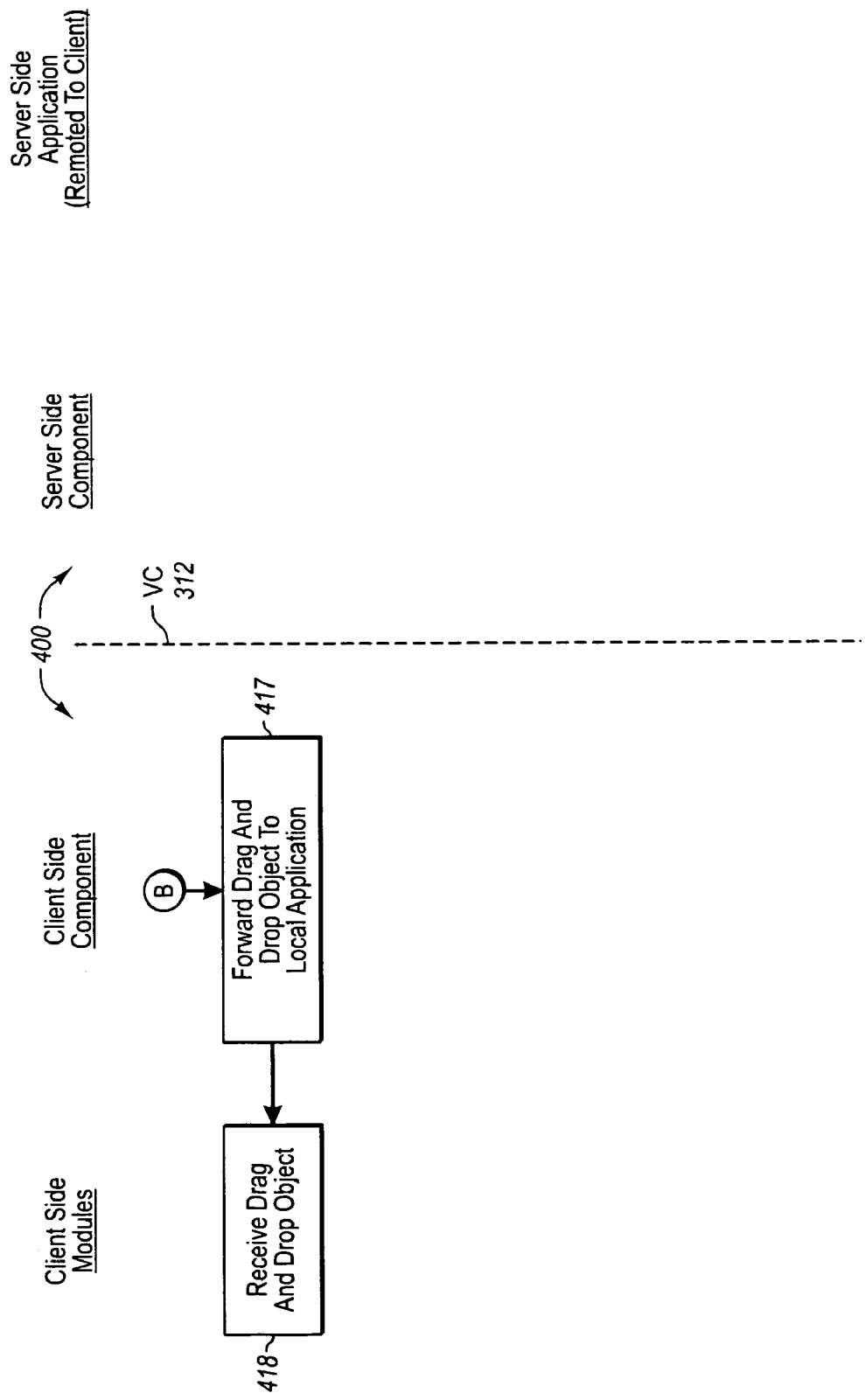

FIGS. 4A-4C illustrate a flow chart of an example method 400 for dragging and dropping an object from a remote module to a local module. The method 400 will be described with respect to the components and data in computer architecture 300.

Method 400 includes an act of selecting a drag and drop object from a remote application window (act 401). For example, a user of computer system 301 can select object 326 from within application window 312W. Object 326 can be virtually any selectable object at computer system, such as, for example, a portion of text, graphics, or sound data, a spreadsheet cell, a database entry, an electronic message, etc.

Method 400 includes an act of modifying a desktop window cursor to visually represent that a drag and drop object is selected (act 402). For example, after selection of object 326, cursor 333 can be modified to include drop effect indicator 334. Drop effects can include any of moving, copying, linking, creating a hyperlink to, and creating a shortcut to the selected object. Cursor 333 can be modified or supplemented in different ways to indicate different drops effects. For example, drop effect indicator 334 can be displayed to indicate that the drop effect is move.

A drop effect can be selected from the drop effects available to an application. As cursor 333 transitions between different windows of desktop window 323, the presented drop effect indictor can change. For example, while cursor 333 is within the bounds of application window 312W, a default drop effect for application 312 (e.g., of move) can be displayed. When cursor 333 is outside the bounds of any application window, a default drop effect for desktop window 323 (e.g., the operating system) can be displayed. For example for desktop window 323, drag and drop functionality may not be supported at all and thus cursor 333 is transformed to the "not permitted" symbol when in this area of user-interface 304. Upon entering application window 302W, a default drop effect for application 302 (e.g., of move) can be displayed.

Method 400 includes an act of a client component detecting that the desktop window cursor has been moved from outside to within the bounds of a remote application window (act 403). For example, client component 306 can detect that cursor 333 has been moved from outside of to within the bounds of application window 302W. (The dashed line in FIG. 3B indicates the path of cursor 333 from application window 312W, through remote desktop 313 and desktop window 323, to application window 302W.)

Method 400 includes an act of sending a message indicating that the desktop window cursor has moved (act 404). For example, client component 306 can send a MOUSE_HAS_LEFT message to server component 316 over virtual channel 321. The MOUSE_HAS_LEFT message indicates that cursor 333 has moved outside of application window 312W (and/or out of remote desktop 313). Method 400 includes an act of receiving a message indicating that the desktop window cursor has moved (act 405). For example, server component 316 can receive the MOUSE_HAS_LEFT message over virtual channel 321 from client component 306.

Method 400 includes an act of determining that movement of the desktop window cursor is associated with a pending drag and drop operation (act 406). For example, server component 316 can determine that moving cursor outside the bounds of application window 313 is associated with a drag and drop operation for object 326. Server component 316 can call a Common Object Model ("COM") API to query whether an actual drag and drop operation is pending or if the mouse is being moved for other reasons.

Acts 401, 402, 403, 404 and 405 can be included as part of setting up a drag and drop operation from a remote module to a local module. For example, when a user presses a mouse button down in the client window, the mouse is captured by an input handler window. While the mouse is being dragged, the mouse can be repeatedly checked to determine if still hovering over the input handler window. If the mouse is not hovering over the input handler window, then a drag has possibly been started from a remote module to a local module. After it has been detected that the mouse has left the remote module, a MOUSE_HAS_LEFT message is sent to server component 316 over the virtual channel.

Upon receiving this message, the server component 316 is transitioned to become a proxy drop target. A transition to proxy drop target can be accomplished using at least two different mechanisms. One mechanism includes maximizing the alpha-blended drag and drop window to fill the entire session screen real-estate, and then forcing the alpha-blended drag and drop window to the top of the z-order. Another mechanism includes calling OLE APIs.

After transitioning to a proxy drop target server, component 316 can act as a proxy drop target in the remote session. For example, upon becoming a proxy drop target, a DragEnter method for server component 316 can be called.

The DragEnter method causes object 326 to be stored and a START_DRAG_DROP message to be sent to client component 306.

The START_DRAG_DROP message can be processed by an event handler at client component 306. The event handler can extract the format names and allowed drop-effects. In response, client component 306 can initiate a DO_MODAL_LOOP event to inform an input handler for computer system 301 that a local drag and drop loop is to be started. Upon receiving the DO_MODAL_LOOP event, the input handler constructs proxy object 328 and redirects drag and drop notification events to client component 306. Thus, causing client component 306 to transition to a proxy drop source.

Drag and drop notification event can be redirected by disabling the event sinks on a drag and drop thread, and enabling specially created event sinks for client component 306. Before the DoDragDrop modal loop is started, the drag and drop thread can be signaled to inform it that the loop is about to start. In response, client comment 306 can send a START_DRAG_DROP_RESPONSE message to server component 316. On reception of START_DRAG_DROP_RESPONSE message, server component 316 is freed to send drag and drop messages, such as, for example, DO_DRAG_DROP and STOP_DRAG_DROP messages, to client component 306.

However, while the mouse is being dragged around in application window 302W, various mouse and keyboard button events may be of interest. A QueryContinueDrag on application 312 (the remote application) can be used to obtain updates to this information. To update the server component 316 with the current input state an input handler sends an appropriate mouse button up or down and keyboard button up or down. A GiveFeedback method is called on client component 306 to update server component 316 with the drop-effect returned by application 302, by leveraging the UPDATE_DROP_EFFECT message. At computer system 311, the drop-effect is stored and later returned in a DragOver method invoked by server component 316

Based on the mouse and keyboard state at computer system 301, application 312 can eventually decide to cancel the drag operation or allow a drop to occur. Thus in some embodiments, a drag operation is canceled (and thus no drop occurs). If a cancel takes place, server component 316 (the proxy drop target) is informed through a DragLeave method In response to a cancel, server component 316 can also send a STOP_DRAG_DROP message to client component 306. After a STOP_DRAG_DROP message has been sent, object 326 can be released. An event handler for client component 306 can store the cancel result indicated in a STOP_DRAG_DROP message. Thus, the next time QueryContinueDrag is called, it returns DRAGDROP_S_CANCEL, causing the drag operation to end at computer system 301.

In other embodiments, a drop occurs. As a user moves a mouse around over local application window 302W the user may release a mouse button. When the mouse button is released, client component 306 indicates the release to server component 316 over virtual channel 321. In response, server component 316 can send a DO_DRAG_DROP message to client component 306 to request transfer of object 326 to application 302. Server component 316 can send an indication of the DO_DRAG_DROP message to application 302. Client component 306 can send a DO_DRAG_DROP_RESPONSE message to server component 316 over virtual channel 321.

Method 400 includes an act of sending a query for a drag and drop object (act 407). For example, in response to the indication of the DO_DRAG_DROP message, application 302 can query for proxy object 328. Method 400 includes an act of receiving a query for a drag and drop object from a local application (act 408). For example, client component 306 can receive a query for object 326 from application 302.

Method 400 includes an act of sending a request for the drag and drop object to the server component (act 409). For example, client component 306 can send a FORMAT_DATA_REQUEST message to server component 316 over virtual channel 321. The FORMAT_DATA_REQUEST message requests object 326 for application 312. Method 400 includes an act of receiving a request for a drag and drop object from the client component (act 410). For example, server component 316 can receive the FORMAT_DATA_REQUEST message from client component 306 over virtual channel 321.

Method 400 includes an act of forwarding the request for the drag and drop object to the remoted application (act 411). For example, server component 316 can forward the request for object 326 to application 312. Method 400 includes an act of receiving a request for a drag and drop object (act 412). For example, application 312 can receive the request for object 326 from server component 316.

Method 400 includes an act of sending the drag and drop object (act 413). For example, application 312 can send object 326 to server component 316. Method 400 includes an act of receiving the drag and drop object from the remoted application (act 414). For example, server component 316 can receive object 326 from application 312.

Method 400 includes an act of sending the drag and drop object to the client component (act 415). For example, server component 316 can send a FORMAT_DATA_RESPONSE message, including data form object 326, to client component 306 over virtual channel 321. Method 400 includes an act of receiving the drag and drop object from the server component (act 416). For example, client component 306 can receive the FORMAT_DATA_RESPONSE message, including data from object 326, from server component 316 over virtual channel 321.

Method 400 includes an act of forwarding the drag and drop object to the local application (act 417). For example, client component 306 can forward data from object 326 to application 312. Method 400 includes an act of receiving the drag and drop object (act 418). For example, application 302 can receive data from object 306 from client component 306. Accordingly, depending on the selected drop effect, data from object 326 is moved, copied, linked, hyperlinked, or shortcutted from application 312 to application 302.

Client component 306 (the proxy drop source) and server component 316 (the proxy drop target) can be configured in various different ways to facilitate the implementation of method 400.

For example, client component 306 (the proxy drop source) can be configured to create a proxy data object advertising the correct format names, relay the current drop effect to server component 316, indicate a cancel or drop when instructed by server component 316, and update mouse keystate and keyboard state within application window 312W. A QueryContinue drag method can be used to receive a keystate vector containing keyboard keys and mouse button states. The keyboard keys and mouse button states can be sent to server component 316 via virtual channel 321.

Server component 316 (the proxy drop target) can be configured to indicate when the drag and drop modal loop is to start, send the list of formats that application 312 can provide, return the latest drop effect received from client component 306 to application 312, update client component 306 regarding the state of a pending drag and drop operation, and store a pointer object 326 if a drop occurs.

Proxy data object 328 can be created when a START_DRAG_DROP message is received. Proxy data object 328 essentially mimics object 326 by returning the same formats advertised by object 326. When data is requested from proxy data object 328, it sends a FORMAT_DATA_REQUEST message to computer system 311. Server component 316 can then retrieve the data from object 326 and sends the data back in a FORMAT_DATA_RESPONSE message.

Accordingly, embodiments of the present invention can facilitate dragging and dropping objects from a remote module to a local module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A client computer system comprising:

a local application running at the client computer system;

a client component that participates in a terminal server session with a server component at a server computer system; and storage media storing computer-executable instructions which, when executed by the client computer system, cause the client computer system to implement a method for using drag and drop to transfer an object from the local application to a remoted module at the server computer system, wherein the method includes:

an act of receiving user-input selecting a drag and drop object from within a local application window, the local application window representing a user-interface for the local application;

an act of the client component detecting that a desktop window cursor has been moved from outside to within the bounds of an application window for a remoted application;

an act of the client component receiving a drop notification indicating a pending drag and drop operation, the drop notification indicating that a drag and drop object is to be transferred to the remoted application;

an act of the client component sending a start drag drop message to the server component;

an act of the client component sending a request to transfer the drag and drop object along with a coordinate location of the desktop window cursor to the server computer system over the terminal server session in response to receiving the drop notification;

an act of the client component receiving a request for the drag and drop object from the server computer system over the terminal server session;

the client component acting as a proxy drop target on behalf of the remoted application in response to receiving the request for the drag and drop object, including:

an act of forwarding the request for the drag and drop object to the local application;

an act of receiving the drag and drop object from the local application sent in response to the request for the drag and drop object; and an act of the client component sending the drag and drop object to the server computer system over the terminal server session for delivery to the remoted application.

2. The client computer system recited in claim 1, wherein the client component is configured as a proxy drop target such that the client component can receive drag and drop objects from the local application.

3. The client computer system recited in claim 1, wherein the desktop window cursor is modified to visually represent that a drag and drop object has been selected.

4. The client computer system recited in claim 1, wherein the act of detecting that a desktop window cursor has been moved from outside to within the bounds of an application window for a remoted application comprises an act of detecting that the desktop window cursor moved from within the bounds of a local application window to within the bounds of the application window for the remoted application.

5. The client computer system recited in claim 1, wherein the act of the client component receiving a drop notification indicating a pending drag and drop operation comprises an act of detecting a change in the state of buttons on an input device.

6. The client computer system recited in claim 1, wherein the request to transfer the drag and drop object along with a coordinate location of the desktop window cursor is sent in a message over at least one of a virtual channel of the terminal server session, or in a message sent over a Remote Desktop Protocol session.

7. A client computer system comprising:

a local application running at the client computer system;

a client component that participates in a terminal server session with a server component at a server computer system; and storage media storing computer-executable instructions which, when executed by the client computer system, cause the client computer system to implement a method for using drag and drop to transfer an object from the local application to a remoted module at the server computer system, wherein the method includes:

an act of receiving user-input selecting a drag and drop object from within an application window for a remoted application, the application window representing a user-interface for the remoted application on the client computer system;

an act of the client component detecting that a desktop window cursor has been moved from within to outside of the bounds of the application window for the remoted application;

an act of the client component sending a message to the server component over the terminal server session, the message indicating to the server component that the desktop window cursor has been moved from within to outside of the bounds of the application window for the remoted application;

an act of the client component receiving a start drag drop message from the server component, and in response initiating a drag and drop modal loop on the client computer system;

an act of the client component acting as a proxy drop source on behalf of the remoted application in response to receiving the request for the drag and drop object, including an act of the client component receiving a query for a drag and drop object from the local application, the query indicative of a drop notification at the local application representing that the drag and drop object is to be transferred to the local application;

an act of the client component sending a request for the drag and drop object to the server component, the request sent over the terminal server session in response to the query, the request indicating to the server component that the local application is requesting the drag and drop object;

an act of the client component receiving the drag and drop object from the server computer system over the terminal server connection; and an act of the client component acting as a proxy drop source on behalf of the remoted application in response to receiving the drag and drop object, including an act of the client component sending the drag and drop object to the local application.

8. The client computer system recited in claim 7, wherein the act of the client component detecting that a desktop window cursor has been moved from within to outside of the bounds of an application window for a remoted application comprises an act of detecting that the desktop cursor window has been moved from the application for a remoted application to a local application window for the local application.

9. The client computer system recited in claim 7, further comprising:

an act of creating a proxy object to mimic the formats advertised by the drag and drop object.

10. The client computer system recited in claim 7, wherein the client component is configured as a proxy drop source.

11. A server computer system comprising:

a server component that participates in a terminal server session with a client component at a client computer system;

a remoted application running at the server computer system and that are configured to be remotely accessed over the terminal server session by the client computer system; and storage media storing computer-executable instructions which, when executed by the client computer system, cause the client computer system to implement a method for using drag and drop to transfer an object from the remoted application to a module at the client computer system, wherein the method includes:

an act of the server component receiving a message from the client component over the terminal server session, the message indicating to the server component that a desktop window cursor has been moved from within to outside of the bounds of an application window corresponding to a remoted application at the client computer system;

an act of the server component determining that the movement of the desktop window cursor is associated with a pending drag and drop operation;

an act of the server component sending a start drag drop message to the client component;

an act of the server component receiving a request for a drag and drop object from the client component, the request sent over the terminal server session and indicating to the server component that the client component is requesting the drag and drop object from the remoted application;

the server component acting as a proxy drop target on behalf of the application at the client computer system in response to receiving the request for the drag and drop object, including:

an act of forwarding the request for the drag and drop object to the remoted application; and an act of receiving the drag and drop object from the remoted application sent in response to the request for the drag and drop object; and an act of the server component sending the drag and drop object to the client computer system over the terminal server session.

12. The server computer system recited in claim 11, wherein the server component is configured as a proxy drop target such that the server component can receive drag and drop objects from the remoted application.

13. The server computer system recited in claim 11, further comprising:

an act of the server component receiving a DoDragDrop response.

14. The server computer system recited in claim 13, wherein the act of the server component sending the drag and drop object to the client computer system over the terminal server session comprises an act of the server component sending the drag and drop object over a virtual channel of a remote desktop protocol session.

15. A server computer system comprising:

a server component that participates in a terminal server session with a client component at a client computer system;

a remoted application running at the server computer system and that are configured to be remotely accessed over the terminal server session by the client computer system; and storage media storing computer-executable instructions which, when executed by the client computer system, cause the client computer system to implement a method for using drag and drop to transfer an object from the remoted application to a module at the client computer system, wherein the method includes:

an act of the server component receiving a start drag drop message from the client component such that upon receiving the start drag drop message, the server component initiates a drag and drop modal loop for the remoted application;

an act of the server component receiving a request to transfer a drag and drop object to the computer system and a coordinate location indicating the location of desktop window cursor at the client computer system, the request and coordinate location sent over the terminal server session;

an act of the server component forwarding a drag and drop object transfer notification to the remoted application corresponding to the coordinate location;

an act of the server component acting as a proxy drop source on behalf of an application at the client computer system in response to receiving the request to transfer a drag and drop object, including an act of the server component receiving a request for the drag and drop object from the remoted application;

an act of the server component forwarding the request for the drag and drop object to the client component over the terminal server session;

an act of the server component receiving the drag and drop object from the client component over the terminal server session; and an act of the server component acting as a proxy drop source on behalf of the application at the client computer system in response to receiving the drag and drop object, including an act of server component sending the drag and drop object to the remoted application.

16. The server computer system recited in claim 15, wherein the method further includes creating a proxy object to mimic the formats advertised by the drag and drop object.

17. At a computer system which includes a local application running at the computer system and a client component, the client component participating in a terminal server session with a server component at a server computer system, a method for using drag and drop to transfer an object from the local application to a remoted module at the server computer system, the method comprising:

an act of receiving user-input selecting a drag and drop object from within a local application window, the local application window representing a user-interface for the local application;

an act of the client component detecting that a desktop window cursor has been moved from outside to within the bounds of an application window for a remoted application;

an act of the client component receiving a drop notification indicating a pending drag and drop operation, the drop notification indicating that a drag and drop object is to be transferred to the remoted application;

an act of the client component sending a start drag drop message to the server component;

an act of the client component sending a request to transfer the drag and drop object along with a coordinate location of the desktop window cursor to the server computer system over the terminal server session in response to receiving the drop notification;

an act of the client component receiving a request for the drag and drop object from the server computer system over the terminal server session;

the client component acting as a proxy drop target on behalf of the remoted application in response to receiving the request for the drag and drop object, including:

an act of forwarding the request for the drag and drop object to the local application;

an act of receiving the drag and drop object from the local application sent in response to the request for the drag and drop object; and an act of the client component sending the drag and drop object to the server computer system over the terminal server session for delivery to the remoted application.

18. The method as recited in claim 17, further comprising:
an act of configuring the client component as a proxy drop target such that the client component can receive drag and drop objects from the local application.

19. The method as recited in claim 17, further comprising:
an act of modifying a desktop window cursor to visually represent that a drag and drop object has been selected.

20. The method as recited in claim 17, wherein the act of the client component sending a request to transfer the drag and drop object along with a coordinate location of the desktop window cursor to the server computer system over the terminal server session comprises at least one of:
sending a message over a virtual channel of the terminal server session, or
sending a message over a Remote Desktop Protocol session.

21. The method as recited in claim 17, further comprising:
an act of the client component receiving a StartDragDrop response.

22. At a computer system which includes a local application running at the computer system and a client component, the client component participating in a terminal server session with a server component at a server computer system, a method for using drag and drop to transfer an object from a remoted module at the server computer system to the local application, the method comprising:

an act of receiving user-input selecting a drag and drop object from within an application window for a remoted application, the application window representing a user-interface for the remoted application on the client computer system;

an act of the client component detecting that a desktop window cursor has been moved from within to outside of the bounds of the application window for the remoted application;

an act of the client component sending a message to the server component over the terminal server session, the message indicating to the server component that the desktop window cursor has been moved from within to outside of the bounds of the application window for the remoted application;

an act of the client component receiving a start drag drop message from the server component, and in response initiating a drag and drop modal loop on the client computer system;

an act of the client component acting as a proxy drop source on behalf of the remoted application in response to receiving the request for the drag and drop object, including an act of the client component receiving a query for a drag and drop object from the local application, the query indicative of a drop notification at the local application representing that the drag and drop object is to be transferred to the local application;

an act of the client component sending a request for the drag and drop object to the server component, the request sent over the terminal server session in response to the query, the request indicating to the server component that the local application is requesting the drag and drop object;

an act of the client component receiving the drag and drop object from the server computer system over the terminal server connection; and an act of the client component acting as a proxy drop source on behalf of the remoted application in response to receiving the drag and drop object, including an act of the client component sending the drag and drop object to the local application.

23. The method as recited in claim 22, wherein detecting that a desktop window cursor has been moved from within to outside of the bounds of an application window for a remoted application comprises an act of detecting that the desktop cursor window has been moved from the application for a remoted application to a local application window for the local application.

24. The method as recited in claim 22, further comprising:
an act of creating a proxy object to mimic the formats advertised by the drag and drop object.

25. The method as recite in claim 22, further comprising:
an act of modifying a desktop window cursor to visually represent that a drag and drop object has been selected.

26. At a computer system which includes one or more remoted applications running at the computer system and a server component, the server component participating in a terminal server session with a client component at a client computer system, that one or more remoted applications running at the computer system configured to be remotely accessed over the terminal server session by the client computer system, a method for using drag and drop to transfer an object from a remoted application to a module at the client computer system, the method comprising:

- an act of the server component receiving a message from the client component over the terminal server session, the message indicating to the server component that a desktop window cursor has been moved from within to outside of the bounds of an application window corresponding to a remoted application at the client computer system;
- an act of the server component determining that the movement of the desktop window cursor is associated with a pending drag and drop operation;
- an act of the server component sending a start drag drop message to the client component;
- an act of the server component receiving a request for a drag and drop object from the client component, the request sent over the terminal server session and indicating to the server component that the client component is requesting the drag and drop object from the remoted application;
- the server component acting as a proxy drop target on behalf of the application at the client computer system in response to receiving the request for the drag and drop object, including:
  - an act of forwarding the request for the drag and drop object to the remoted application; and
  - an act of receiving the drag and drop object from the remoted application sent in response to the request for the drag and drop object; and
- an act of the server component sending the drag and drop object to the client computer system over the terminal server session.

27. The method as recited in claim 26, further comprising:
an act of configuring the server component as a proxy drop target such that the server component can receive drag and drop objects from the remoted application.

28. The method as recited in claim 26, further comprising:
an act of the server component receiving a DoDragDrop response.

29. The method as recited in claim 26, wherein the drag and drop object is sent over a virtual channel of a remote desktop protocol session.

* * * * *